UNITED STATES PATENT OFFICE.

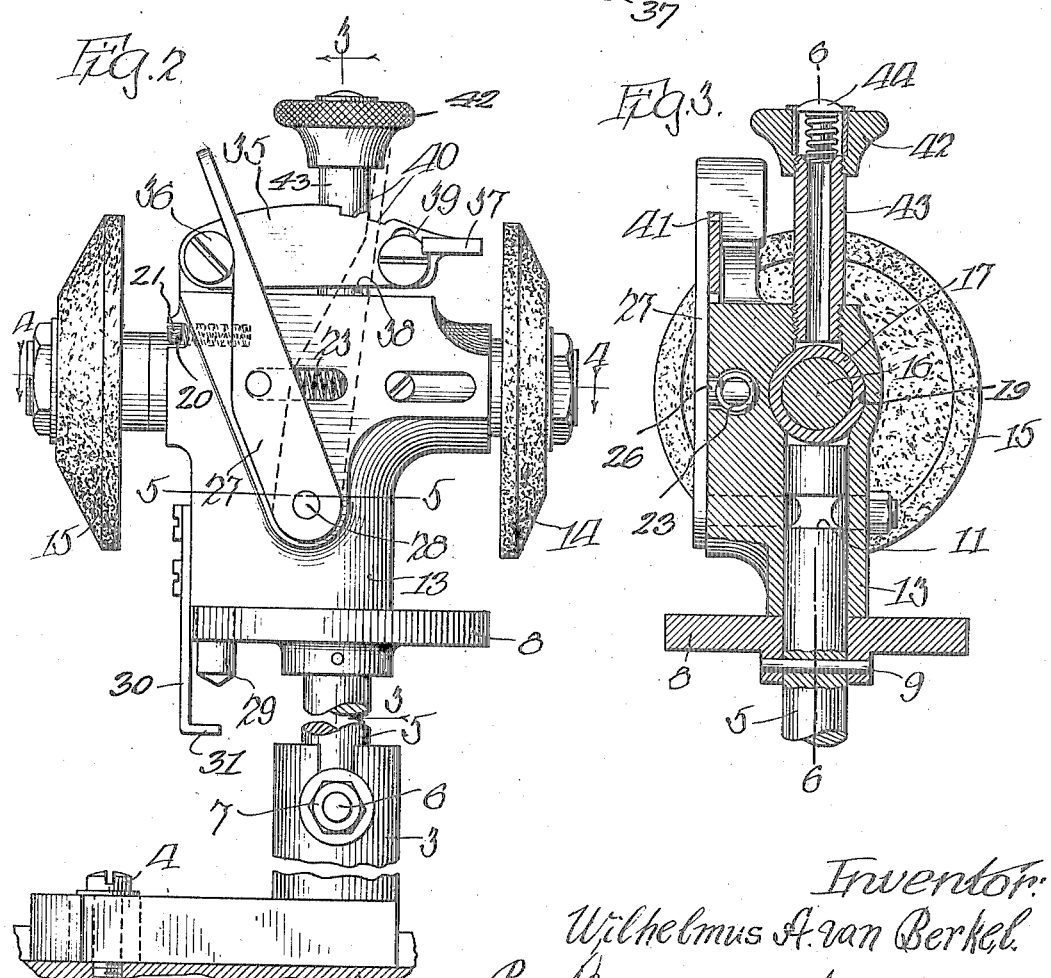

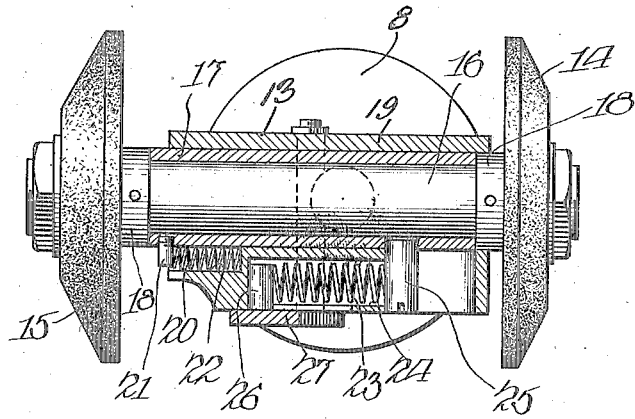
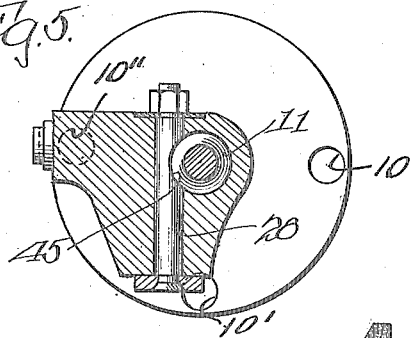
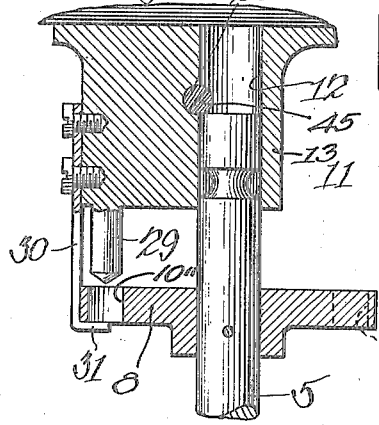
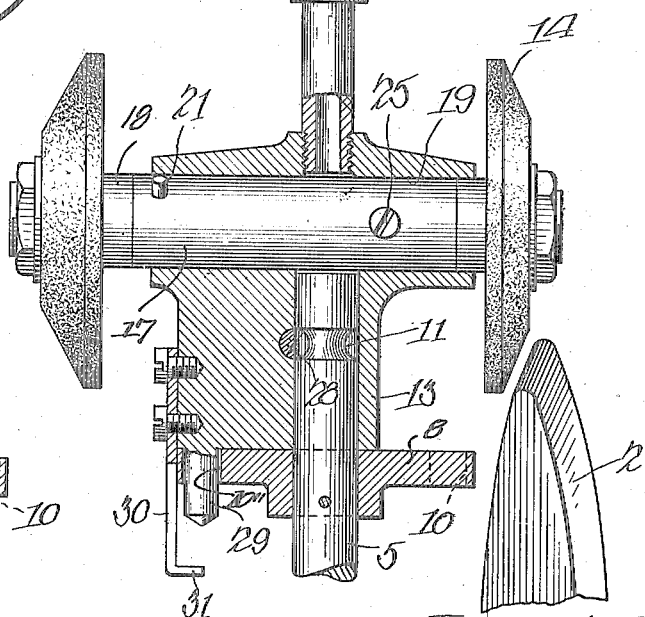

WILHELMUS ADRIANUS van BERKEL, OF ROTTERDAM, NETHERLANDS, ASSIGNOR TO U. S. SLICING MACHINE COMPANY, OF LAPORTE, INDIANA, A CORPORATION OF INDIANA.

SHARPENER FOR SLICING-MACHINES.

1,291,286.

Specification of Letters Patent.

Patented Jan. 14, 1919.

Application filed December 31, 1917. Serial No. 209,611.

*To all whom it may concern:*

Be it known that I, WILHELMUS ADRIANUS VAN BERKEL, a subject of the Queen of the Netherlands, residing at Rotterdam, Netherlands, have invented certain new and useful Improvements in Sharpeners for Slicing-Machines, of which the following is a specification.

This invention relates to a device for sharpening the rotary knives of slicing machines, and has for its object the provision of a device of the class named which shall be of improved construction and more convenient and efficient in its operation than similar devices previously known.

The invention is exemplified in the combination and arrangement of parts shown in the accompanying drawings, and described in the following specification, and it is more particularly pointed out in the appended claims.

In the drawings, Figure 1 is a top plan view of one embodiment of the present invention; Fig. 2 is a side elevation of the device shown in Fig. 1; Fig. 3 is a transverse sectional view on line 3—3 of Fig. 2; Fig. 4 is a horizontal sectional view on line 4—4 of Fig. 2; Fig. 5 is a horizontal sectional view on line 5—5 of Fig. 2, Fig. 6 is a vertical sectional view on line 6—6 of Fig. 3; and Fig. 7 is a fragmentary view similar to Fig. 6 but having the parts in a different position relative to one another.

In the use of machines having disk knives for slicing meat and other material, it is desirable to have a device movable into and out of contact with the knife for sharpening its edge whenever it becomes necessary. It has been found, in practice, that this can be accomplished, to the greatest advantage, by providing grinding disks which may be resiliently pressed into contact with the portion of the knife to be sharpened. It is also desirable to provide a sharpener for both of the lateral faces of the knife, the sharpener which coöperates with the beveled face being arranged to perform the major portion of the sharpening operation, while the second sharpener is operated merely to remove the bur on the flat side of the knife, after the sharpening operation is otherwise completed. In addition to the slight movement imparted to these grinders in a direction transverse to the plane of the knife for the purpose of moving the grinders into and out of contact with the blade, it is desirable to arrange the grinders so that they may be shifted entirely away from the knife after the grinding action is completed, so that they will not interfere with the slicing operation, and will not become coated with grease or fragments of the meat being sliced. Since these grinders are usually operated by butchers and others not especially skilled in the use of machinery, it has frequently happened that the grinders are shifted in such a manner as to mar the edge of the knife. The present invention renders it impossible to so misoperate the grinders.

In the drawings, the numeral 1 designates the upper portion of the standard of a slicing machine frame upon which the rotary knife is mounted, and the numeral 2 indicates the rotary slicing knife. A socket 3 is secured to the standard 1 by means of a lag screw 4, and a post 5 is adjustably held in the socket 3 by means of a pin 6 and nut 7. The post 5 carries a horizontally arranged disk 8 held in position thereon by a pin 9 and provided with a series of openings 10, 10' and 10'' for a purpose to be explained.

The post 5 is provided, near its upper end, with a peripheral groove 11, and the portion of the post above the disk 8 is arranged to enter an opening 12 in an irregularly shaped block or frame member 13 which carries the sharpening disks 14 and 15. The disks 14 and 15 are secured to opposite ends of a spindle 16 which is journaled in a sleeve 17 held in fixed relation against movement in the direction of the axis of the spindle 16 by collars 18. The spindle 16 is, however, free to rotate in the sleeve 17. The sleeve 17 is mounted in an opening 19 in the frame block 13 and is free to slide longitudinally relative to the block. It is normally pressed to the left, as viewed in Fig. 4, by a coil spring 20 which bears against a lug 21 threaded into the sleeve 17. The spring 20 is housed within an opening 22 in the block 13. A second spring 23 is located in a similar housing 24 and bears against a second lug 25 threaded into the sleeve 17. The inner end of the spring 23 bears against a lug 26 secured to a lever 27 which is pivoted at 28 to the frame block 13, as shown best in Fig. 2. When the lever 27 is in the position shown in Fig. 2, the spring 20 will hold the sleeve 17, the spindle 16 and the grinders 14 and 15 in the position shown in Fig. 4, which is the inoperative position. If the lever 27 is shifted to the right, as viewed in Fig. 2, the pressure on the spring 23, which is a stiffer spring than spring 20, will overcome the resistance of spring 20 and the grinders will be forced to the right, as viewed in this figure, or into their operative positions.

The grinders are selectively brought into position, on the side adjacent the knife 2, by the rotation of the block 13 about the post 5 and the block is held in its different adjusted positions by a pin 29 which extends downwardly from the lower surface of the block 13 and is located in the plane of the axis of the spindle 16. In order to shift the block 13 about the post 5, it is necessary to raise the block upwardly to withdraw the pin 29 from the opening 10, 10′ or 10″ previous to the rotation of the block about the post. The amount of upward movement is limited by a downwardly extending bar 30 having its lower end offset at 31 to contact with the under surface of the disk 8 when the block 13 is raised upwardly. The opening 10 in the disk 8 is located in a plane passing through the center of the post 5 and perpendicular to the plane of the knife 2. The opening 10′ is located in a plane at right angles to the plane of the opening 10, and the opening 10″ is located in the side of the disk 8 opposite the opening 10 but slightly offset from the plane of that opening. When the pin 29 is positioned in the opening 10″ the grinder 14 will be positioned adjacent the knife but will have its axis inclined to the plane of the knife, as shown in Fig. 1, to cause the beveled portion of the grinder to bear properly against the bevel of the knife. When the post 29 engages the opening 10, the grinder 15 will be positioned adjacent the knife and will have its inner flat surface parallel with the plane of the knife, as shown in broken lines in Fig. 1. When the post 29 engages the opening 10′, both grinders will be shifted away from the knife into inoperative position. When the grinder frame is in the position shown in Figs. 1 and 6, the grinder 14 will be spaced slightly away from the knife 2 when the lever 27 is in inoperative position, and the grinder may be forced into contact with the beveled edge of the knife by moving the lever 27 to the right or in a direction to compress the spring 23. This will cause the grinder to bear against the bevel portion of the blade under tension of this spring. When the grinder frame is rotated to bring the grinder 15 into operative position and the lever 27 is in inoperative position, the grinder 15 will be spaced slightly away from the blade 2 and on the side of the blade opposite the grinder frame. Movement of the lever in this case, against the tension of the spring 23, will draw the grinder 15 inwardly or toward the grinder frame and bring its flat surface into contact with the flat surface of the knife to remove the bur from the edge of the blade. The lever 27 is held in operative position, against the tension of the spring 23, by means of a detent 35 pivoted to the grinder frame at 36 and having a finger piece 37 by means of which it is pressed downwardly. A coil spring 38 normally forces the detent upwardly, a slot 39 being provided to permit a slight oscillation of the detent about its pivot 36. Notches 40 are provided in the upper surface of the detent for engaging a slot 41, in the upper end of the lever 27, to hold the lever in its operative position against the pressure of the spring 23.

The frame 13 is raised and lowered to permit rotation about the post 5 by a finger piece 42 secured to the upper end of a tube 43 threaded into the upper portion of the block 13. The tube 43 may be utilized for oiling the sleeve 17 together with the post 5, and a spring pressed plug 44 is provided for closing the upper end of the opening in the tube. It will be apparent that the grinder frame cannot be rotated about the post 5 until it is lifted into its uppermost position, but it is also desirable to prevent lifting of the frame when either of the grinders is in contact with the blade, for if this should be done, as the grinder leaves the blade, it would be forced over the edge by the tension of the spring 23 and thus spoil the sharpness of the knife. It is also desirable to prevent downward movement of the grinders onto the knife when they are moved by the lever 27 into their operative position relative to the frame 13, for if this should be done, the grinders would be moved downwardly into contact with the edge of the knife since the pressure of the spring 23 is sufficient to force the grinders into the plane of the cutting edge of the knife when the pressure is not opposed by contact between the grinder and the lateral face of the knife. To avoid any possible marring of the knife edge by improper operation of the grinder an interlocking arrangement is provided between the lever 27 and the post 5. The lever 27 is rigidly secured to its pivotal support 28 extending through a transverse opening in the block 13 which is arranged to lie in the same horizontal plane as the groove 11 in the post 5 when the block 13 is in its lowered position. The pin 28 is provided with a notch 45 which has the same radius of curvature as the periphery of the post 5 and is arranged to lie in alinement with the outer surface of the post 5, as shown in Fig. 5, when the lever 27 is in its inoperative position. The portion of the post 5, above the groove 11, is of such a length that when the frame block 13 is raised to bring the end of the post 29 above the upper surface of the disk 8, as shown in Fig. 7, the pivot pin 28 will be in position above the upper end of the post 5.

It will be readily understood that this arrangement makes it impossible to operate the lever 27 except when the block 13 is in its lowermost position so that the pin 28 may turn in the groove 11 or when the block 13 is in its uppermost position so that the pin may have room to rotate above the upper end of the post 5. It will also be seen that if the lever 27 is moved to its operative position when the frame block is either raised or lowered, it then becomes impossible to shift the frame block upwardly or downwardly. The result obtained by this arrangement will now be readily understood. Suppose the grinder frame block is in its lowered position and the pin 29 is in the opening 10' to bring the axis of the grinder spindle in alinement with the plane of the blade. This is the proper position in which the grinder should be left when it is not being used. Now to bring the grinder into position to sharpen the knife, the operator grasps the handle 42 and raises the frame block 13 and the associated parts upwardly. This movement is permitted by the pivot pin 28 because the lever 27 is in its inoperative position to cause the opening 45 in the pin to extend in alinement with the periphery of the post 5. As soon as the frame has been lifted a sufficient amount to cause the pin 29 to clear the openings in the disk 8, the frame may be shifted about its vertical axis to bring either of the grinders 14 or 15 into position adjacent the knife, and as soon as the proper angular position about the axis of the post 5 has been secured, the frame may be moved downwardly guided by the pin 29 in the corresponding opening in the disk 8 and thus the grinder be brought opposite the portion of the blade to be sharpened. The grinder may now be shifted by movement of the lever 27 in a direction transverse to the plane of the knife and brought to bear against the lateral face of the knife to perform a grinding operation, and after this has been completed, the operation as described may be reversed to return the grinder to its original inoperative position. Suppose now, the operator attempts to shift the lever 27 before he raises the frame block 13 into its upper position. This he is able to do because the pivot pin 28 is adjacent the groove 11, but after the shift has been made, he is prevented from lifting the frame because of the rotation of the pin 28 which rotates the opening 45 out of its alining position with the periphery of the post 5. The operator is therefore prevented from moving the disks 14 into contact with the knife while their spindle is shifted to bring the disks into position to strike the knife edge.

Suppose again the operator does lift the frame before shifting the lever 27, but while the frame is in its uppermost position shifts the lever. This he may do because the pin 28 is above the upper end of the post 5, but after the shift has been made, he is unable to move the frame downwardly again because the pin 28 has been shifted into position to strike the upper end of the post 5 if such downward movement is attempted. He is, therefore, required to return the lever to its inoperative position and thus move the grinders 14 into a position in which they will not strike the edge of the knife before he is able to move the grinders downwardly into a position opposite the lateral face of the knife. In a similar manner, he is prevented from lifting the grinder after a sharpening operation has been completed until he has moved the lever 27 to withdraw the grinder from contact with the knife. This is true because the pin 28, coöperating with the groove 11, locks the grinder frame in its lower position while the lever is moved to force the grinders into contact with the blade. It will thus be apparent that the sequence of operation is controlled at every step so that it is impossible to wrongly operate the grinders in a manner to mar the edge of the blade.

I claim:

1. In combination, a grinder for a slicing machine knife, mechanism for moving said grinder into and out of operative relation with said knife, and means for preventing improper operation of said grinder-moving mechanism in a manner to mar said knife.

2. In combination, a grinder for a slicing machine knife, mechanism for moving said grinder into and out of operative relation with said knife by a series of steps, and means for preventing the performance of said steps in improper sequence.

3. In combination, a grinder for a slicing machine knife, means for moving said grinder into operative relation with said knife by a movement in the direction of the plane of said knife and a subsequent movement in a transverse direction to the plane of said knife, and means for preventing said movement in the direction of the plane of said knife in case said transverse movement has been previously performed.

4. In combination, a grinder for a slicing machine knife, means for moving said grinder out of operative engagement with said knife by a movement in a direction transverse to the plane of said knife and a subsequent movement in a different direction, and means for preventing the last-mentioned movement prior to the performance of the first-mentioned movement.

5. In combination, a grinder for a slicing machine knife, a support for said grinder movable into and out of operative position, means for moving said grinder into and out of operative position relative to said support, and means for preventing movement of said support when said grinder is in operative position relative thereto.

6. In combination, a grinder for a slicing machine knife, a support for said grinder movable into and out of operative position, means for shifting said grinder relative to said support, and means for preventing the movement of said support when said grinder is in a given position.

7. In combination, a grinder for a slicing machine knife, a support for said grinder movable into and out of operative position relative to said knife, means for shifting said grinder into and out of operative position relative to said support, and means for preventing movement of said grinder into operative position relative to said support when said support is in a given position.

8. In combination, a grinder for a slicing machine knife, a support for said grinder movable toward and away from said knife, means for shifting said grinder relative to said support, and means for preventing movement of said support toward said knife when said grinder is in such position relative thereto as to strike the edge of said knife if said support were moved toward said knife.

9. In combination, a grinder for a slicing machine knife, a support for said grinder movable into and out of operative position relative to said knife, means for moving said grinder relative to said support to bring said grinder into and out of operative relation with said knife when said support is in operative position, and means for preventing movement of said support away from operative position when said grinder is in operative position relative to said knife.

10. In combination, a grinder, a support for said grinder, means for shifting the position of said grinder relative to said support, and a locking device for preventing shifting of said grinder.

11. In combination, a slicing machine frame, a grinder support movable relative to said frame, a grinder carried by said support and movable relative thereto, and a locking device for preventing movement of said grinder relative to said support when said support is in a given position relative to said frame.

12. In combination, a slicing machine frame, a grinder support mounted on said frame and movable relative thereto, a grinder carried by said support, means for shifting said grinder relative to said support, and a locking device for preventing movement of said support relative to said frame when said grinder is in one position relative to said support.

13. In combination, a grinder for a slicing machine knife, means for moving said grinder into and out of contact with said knife by a plurality of movements, and means for controlling the sequence of said movements.

14. In combination, a grinder for a slicing machine knife, a support for said grinder movably carried by the frame of a slicing machine, and an interlocking device for controlling the movement of said grinder relative to said support and the movement of said support relative to said slicing machine frame.

15. In combination, a slicing machine frame, a grinder support movably mounted on said frame, a grinder movably carried by said support, and an interlocking device controlled by the position of said support relative to said frame for controlling the movement of said grinder relative to said support.

16. In combination, a slicing machine frame, a grinder support movable relative to said frame, a grinder mounted on said support and movable relative thereto, and an interlocking device controlled by the position of said grinder relative to said support for controlling the movement of said support relative to said frame.

17. In combination, a slicing machine frame, a grinder support movably mounted on said frame, a grinder movably carried by said support, and an interlocking device for controlling the movement of said grinder relative, to said support and the movement of said support relative to said frame so that the two movements are made to depend one upon the other.

18. In combination, a slicing machine frame, for supporting a slicing knife, a grinder for the knife supported by said frame, a support for said grinder mounted on said frame and movable relative thereto to bring said grinder into and out of a position opposite said knife, means for moving said grinder relative to said support for bringing said grinder into and out of contact with said knife, and an interlocking device arranged to prevent movement of said support to shift said grinder away from said knife when said grinder is in contact with said knife and also arranged to prevent movement of said support to shift said grinder into contact with said knife.

19. A sharpener for slicing machines comprising a grinding device, resilient means for holding said grinding device out of operative position, and resilient means for forcing said grinding device into operative position.

20. The combination with a grinding device for sharpening the blade of a slicing machine, of resilient means for holding said grinding device out of contact with said blade, and a second resilient means for forcing said grinding device into contact with said blade against the tension of said first mentioned resilient means.

21. The combination with a grinder for a slicing machine blade, of a spindle on which said grinder is mounted, resilient means for moving said spindle longitudinally in one direction, and a second resilient means for moving said spindle longitudinally in the opposite direction.

22. In a sharpening device for slicing machines, a spindle having a grinder carried thereby, a spring for moving said spindle longitudinally in one direction, a second spring arranged to oppose the action of the first mentioned spring, and means for exerting pressure on said second spring to cause said second spring to overcome the tension of said first spring to shift said spindle and move said grinder.

23. The combination with the frame of a slicing machine, of a sharpener support mounted for vertical movement thereon, a grinder carried by said sharpener support and movable relative thereto into and out of operative position, a lever for shifting said grinder, and means connected with said lever for locking said sharpener support against vertical movement when said grinder is moved into operative position.

24. The combination of a grinder for a slicing machine knife, a support for said grinder movable relative to said knife, mechanism for shifting said grinder relative to said support into and out of contact with said knife, and a locking device for preventing movement of said support to move said grinder into or out of contact with said knife.

25. The combination of a grinder support for a slicing machine, a post on which said support is mounted, a grinder carried by said support, a lever for moving said grinder relative to said support into and out of contact with the knife of said slicing machine, and an interlocking connection between said post and lever to control the sequence of movement of said support relative to said post and said grinder relative to said support.

26. The combination with a supporting post having a peripheral groove therein, a grinder support carried on said post and movable relative thereto, a grinder movably carried by said support, a lever for operating said grinder, having a rotary pin connected therewith and arranged to lie adjacent said supporting post and having an opening therein for permitting movement of said support relative to said post when said lever is in a given position and arranged to coöperate with said post to prevent such movement when said lever is in a different position.

In testimony whereof I have signed my name to this specification on this nineteenth day of November, A. D. 1917.

WILHELMUS A. van BERKEL.

Witnesses:
 H. J. J. ERMEDLE,
 B. C. van NEEMS.